United States Patent [19]

Sakuma

[11] 3,982,116
[45] Sept. 21, 1976

[54] SLIT ILLUMINATION SYSTEM FOR COPYING MACHINE

[75] Inventor: Nobuo Sakuma, Tokyo, Japan

[73] Assignee: Ricoh Co., Ltd., Tokyo, Japan

[22] Filed: Aug. 5, 1975

[21] Appl. No.: 602,045

[30] Foreign Application Priority Data

Aug. 6, 1974 Japan.............................. 49-89974

[52] U.S. Cl.................................. 240/1.3; 355/8; 355/67
[51] Int. Cl.².................. G03B 15/02; G03B 27/54
[58] Field of Search............. 240/1.3, 41.1, 41.35 R, 240/41.35 C, 44.1; 355/67, 8, 84

[56] References Cited

UNITED STATES PATENTS

| 3,302,519 | 2/1967 | Young................................ 355/67 X |
| 3,368,071 | 2/1968 | Bentzman..................... 240/41.35 R |
| 3,467,469 | 9/1969 | Hastings et al. ...................... 355/67 |
| 3,669,538 | 6/1972 | Fowler................................. 355/67 |
| 3,724,942 | 4/1973 | Gibson et al......................... 355/8 X |
| 3,807,856 | 4/1974 | Rodriguez........................... 355/8 X |
| 3,834,807 | 9/1974 | Fuller et al. ........................ 355/8 X |

OTHER PUBLICATIONS

"Slotted Aperture", G. T. Williams, pp. 3320, 3321, IBM Tech. Bull., vol. 14, no. 11, Apr. 1972.
"Illumination Arrangement" (13517) p. 17 Research Disclosure July 1975.
"Illumination to Eliminate Shadows", J. D. Bersot et al., p. 521, IBM Tech. Bull., vol. 15, No. 2, July 1972.

*Primary Examiner*—R. L. Moses
*Attorney, Agent, or Firm*—Frank J. Jordon

[57] ABSTRACT

In an electrostatic copying machine, an original document is scanned by moving an original document over an illuminated slit. The system for illuminating the slit comprises an elongated light source and a first elliptic cylindrical mirror having a focus coincident with the axis of the light source to reflect light from the source into the slit. A second elliptic cylindrical mirror has a focus common with the first mirror and reflects light from the source parallel to the slit. A plane mirror reflects the light reflected from the second mirror into the slit.

8 Claims, 3 Drawing Figures

SLIT ILLUMINATION SYSTEM FOR COPYING MACHINE

The present invention relates to a slit illumination system for an electrostatic copying machine or the like.

In a typical electrostatic copying machine employing a slit illumination system, an original document to be copied is placed on a horizontal transparent platen and the platen and document are moved over an illuminated slit to accomplish scanning. It is known to place an elongated light source such as a tubular fluorescent bulb at one focus of an elliptic cylindrical mirror to focus light from the bulb into the slit. The other focus of the elliptic cylindrical mirror lies either in the slit or slightly beyond it. A major problem is that due to the construction of the mirror, a shadow of the bulb is produced in the slit thus degrading the distribution of illumination. In Japanese patent application SHO 48-108919 by the present inventor, the elliptic cylindrical mirror is disclosed as being formed in two sections in such a manner as to eliminate the bulb shadow effect. However, the angle of incidence of the illuminating light on the platen (measured from the surface of the platen) is decreased and the reflection losses are increased.

It is important object of the present invention to provide a slit illumination system comprising an elongated light source, a first elliptic cylindrical mirror to reflect light from the source into the slit, a second elliptic cylindrical mirror to reflect light from the source generally parallel to the slit and a third plane mirror to reflect the light reflected from the second mirror into the slit.

It is another object of the present invention to provide a slit illumination system which provides increased illumination efficiency over the prior art.

It is another object of the present invention to provide a slit illumination system which provides an even distribution of illumination in the slit.

It is another object of the present invention to provide a slit illumination system which provides easy adjustment of the intensity and distribution of illumination.

It is another object of the present invention to provide a slit illumination system which minimizes thermal damage to the platen and original document by preventing light from the source from being directed to areas on the platen other than the slit.

It is another object of the present invention to provide a slit illumination system which provides increased compactness of a copying machine in which it is employed.

It is another object of the present invention to provide a slit illumination system which is adaptable to a copying machine employing a CELFOCK (trade name) assembly.

The above and other objects, features and advantages of the present invention will become more clear from the following detailed description taken with the accompanying drawings, in which.

In an electrostatic copying machine, it is convenient to place an original document to be copied on a transparent platen and move the platen and document over an illuminated slit for scanning. A system for illuminating the slit should meet the following requirements.

1. The illuminating efficiency should be high.
2. The illumination should be evenly distributed in the slit.
3. The entire slit should be illuminated.
4. The system should be compact.
5. The system should not overheat the platen, original document or any other components of the copying machine.

Figure 1:
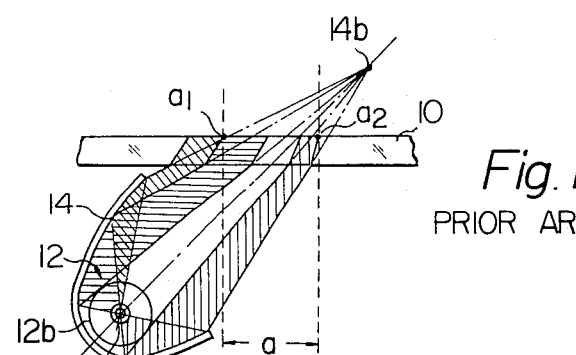
FIG. 1 is a schematic diagram of a prior art slit illumination system to which the present invention is an improvement.

Referring now to FIG. 1, a prior art system conceived to fulfil these requirements is adapted to illuminate a slit $a$ defined between vertical parallel dashed lines passing through points $a1$ and $a2$ which are perpendicular to a transparent platen 10. An original document which is not shown is placed on top of the platen 10 to be copied and the platen 10 and document are moved right or left as viewed in FIG. 1 for scanning. The slit illumination system comprises an elongated light source such as a fluorescent bulb 12 which has a filament $12a$ and a cylindrical tube $12b$. An elliptic cylindrical mirror 14 has a first focus $14a$ which is coincident with the filament $12a$ which lies on the axis of the bulb 12 and a second focus $14b$ which lies above the platen 10. If the second focus $14b$ was adapted to lie in the slit $a$ (in the portion of the platen 10 between the lines $a1$ and $a2$), the illumination would not fill the entire slit $a$.

A major problem with this system is that although light is reflected sufficiently from the bulb 12 and the upper portion of the mirror 14 (as shown by horizontal hatching) and from the bottom portion of the mirror 14 (as shown by vertical hatching) into the slit $a$, light reflected from the center of the mirror 14 is blocked by the tube $12b$ so that a shadow of the tube $12b$ is formed in the slit $a$ as designated by a blank area between the horizontal and vertical hatched areas. The illumination is therefore uneven, specifically because of a dark area constituted by the shadow of the tube $12b$ in the center of the slit $a$. In addition, light refracted by the lower surface of the platen 10 spills over into an area outside of the slit $a$ as designated by a diagonally hatched area in the drawing. This reduces the illumination efficiency of the system and leads to overheating of the platen 10, document and other components of the copying machine.

Figure 2:
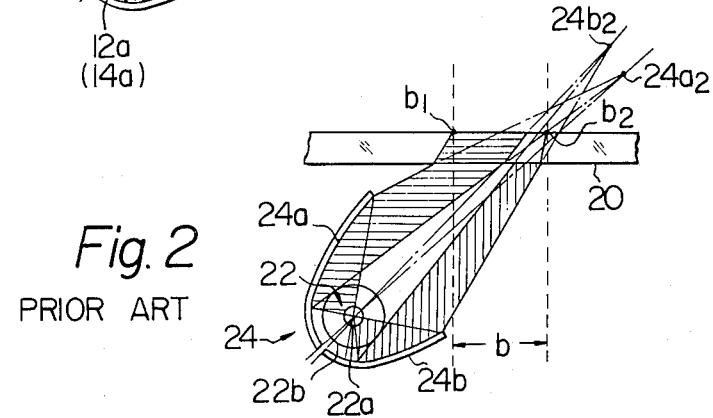
FIG. 2 is similar to FIG. 1 but shows another prior art slit illumination system.

An improvement to the system of FIG. 1 is shown in FIG. 2, said improvement being disclosed in Japanese patent application SHO 48-108919 by the present inventor. A slit $b$ is defined between vertical dashed lines passing through points $b1$ and $b2$ at the upper surface of a platen 20. A bulb 22 is identical to the bulb 12 and has a filament $22a$ and a tube $22b$. An elliptic cylindrical mirror 24 has an upper section $24a$ and a lower section $24b$ which are shown as being separate. The sections $24a$ and $24b$ have first focii $24a1$ and $24b1$ which are coincident with the filament $22a$ and second focii $24a2$ and $24b2$ which lie above the platen 20. Light from the bulb 22 is reflected into the slit $b$ by the upper section $24a$ as shown by a horizontally hatched area and by the lower section $24b$ as shown by a vertically hatched area. These hatched areas just meet or slightly overlap in the slit $b$ to eliminate the effect of the shadow of the tube $22b$ which is designated by a blank area between the hatched areas. However, although the system of FIG. 2 eliminates the problem of the shadow of the tube 22b, it introduces another problem in that the angle of incidence (measured from the lower surface of the platen 20) of the light reflected from the upper section 24a must necessarily be reduced, which increases the reflection loss of the light reflected from the section 24a.

Figure 3:
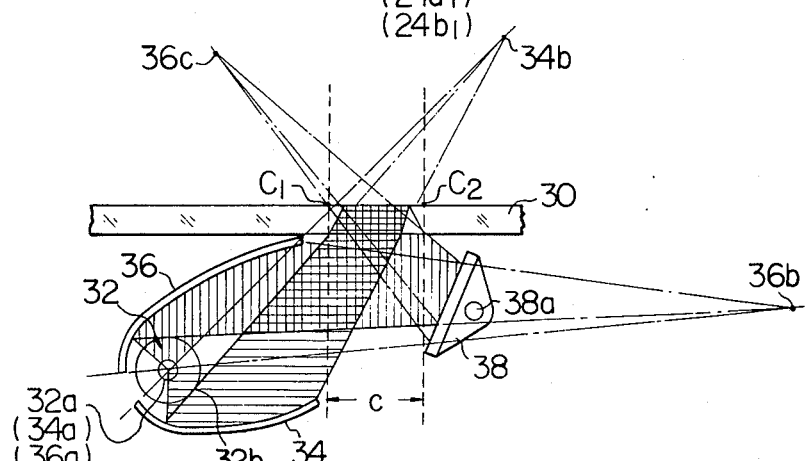
FIG. 3 is a schematic diagram of a slit illumination system embodying the present invention.

Reference will now be made to FIG. 3 which shows an embodiment of the present invention adapted to overcome the above problems.

A transparent platen 30 is provided, and a slit c is defined btween vertical dashed lines passing through points c1 and c2 of the upper surface of the platen 30. A plane of the slit c is defined by the upper surface of the platen 30 between the points c1 and c2. A direction perpendicular to the plane of the slit c is therefore vertical as viewed in FIG. 3 and a direction parallel to the plane of the slit c is horizontal as viewed in FIG. 3. The system of the present invention comprises a bulb 32 identical to the bulb 12 and having a filament 32a defining an axis of the bulb 32 and a tube 32b coaxially surrounding the filament 32a. The filament 32a is parallel to the plane of the slit c. A first elliptic cylindrical mirror 34 is spaced below the bulb 32 from the platen 30 and has a first focus 34a coincident with the filament 32a and a second focus 34b lying above the platen 30. A second elliptic cylindrical mirror 36 has a first focus 36a coincident with the filament 32a and a second focus 36b. A third plane mirror 38 is disposed to the right of the mirror 36 and is adjustably rotatable about a shaft axis 38a which is parallel to the filament 32a. The first and second mirrors 34 and 36 and the bulb 32 are spaced to the left of the slit c and the third mirror 38 is spaced to the right of the slit c.

In operation, light from the bulb 32 is reflected from the first mirror 34 diagonally upwards into the slit c as designated by horizontal hatching. Light from the bulb 32 is reflected generally horizontally by the second mirror 36 onto the surface of the third mirror 38. This light is reflected by the third mirror 38 diagonally upwards into the slit c. Preferably, the light is reflected into the slit c by the first and third mirrors 34 and 38 at equal and opposite angles of incidence to the platen 30. An image 36c of the focus 36b of the mirror 36 lies above the platen 30.

Examination of FIG. 3 will disclose that all of the problems of the prior art are solved by the present invention. Since the harched areas designating the illuminating light reflected into the slit c from the mirrors 34 and 38 overlap, the intensity of illumination is increased and the illumination is evenly distributed in the slit c. Specifically, there is no shadow of the tube 32b in the slit c. It will also be noticed that the angle of incidence of the light reflected from the mirror 38 of FIG. 3 is greater than that of the light from the mirror 24a of FIG. 2 thereby reducing reflection and scattering losses. Since the mirror 36 reflects light from the bulb 32 generally horizontally, the assembly of the bulb 32 and mirrors 34 and 36 can be placed closer to the platen 30 than is possible in prior art configurations, thereby increasing the compactness of the illumination system and the associated copying machine. This orientation of the mirror 36 also allows the mirror 36 to serve as a baffle to prevent light from the bulb 32 from falling on portions of the platen other than the slit c.

The mirror 38 is rotatable about the axis 38a to allow adjustment of the intensity and distribution of illumination. Although the mirror 38 has been described as being a plane mirror, it may be cylindrical (either concave or convex) depending on the application.

Many other modifications to the disclosure will become possible to those skilled in the art after receiving the teachings thereof. For example, the mirrors 36 and 38 may have a cross section other than elliptic, for example, other conic sections (circular or parabolic). Another possible modification is to orient the second mirror 36 to reflect light downward and lower the third mirror 38. This would have the effect of increasing the angle of incidence of the light reflected from the third mirror 38 into the slit c.

What is claimed is:

1. A slit illumination system, comprising:
   an elongated light source having an axis arranged parallel to a plane of the slit;
   a first cylindrical mirror spaced farther from said plane than the light source and having an axis parallel to said axis of the light source, the first cylindrical mirror being arranged to reflect light from the light source into the slit;
   a second cylindrical mirror spaced between said plane and the light source and having an axis parallel to said axis of the light source, the second cylindrical mirror being arranged to reflect light from the light source generally parallel to said plane; and
   a third mirror arranged to reflect the light reflected from the second cylindrical mirror into the slit.

2. The illumination system of claim 1, in which the first and second cylindrical mirrors have cross sections defined by conic sections, the conic sections having focii coincident with said axis of the light source.

3. The illumination system of claim 1, in which the first cylindrical mirror has an elliptical cross section with a focus coincident with said axis of the light source.

4. The illumination system of claim 1, in which the second cylindrical mirror has an elliptical cross section with a focus coincident with said axis of the light source.

5. The illumination system of claim 1, in which the third mirror is a plane mirror.

6. The illumination system of claim 1, in which the third mirror is adjustably rotatable about an axis parallel to said axis of the light source.

7. The illumination system of claim 1, in which the first and second cylindrical mirrors and the light source are arranged on one side of the slit in a direction parallel to said plane of the slit and the third mirror is arranged on an opposite side of the slit in said direction parallel to said plane of the slit.

8. The illumination system of claim 1, in which the first and second cylindrical mirrors have elliptic cross sections having focii coincident with said axis of the light source.

* * * * *